United States Patent [19]
Sathaye et al.

[11] Patent Number: 5,517,617
[45] Date of Patent: May 14, 1996

[54] AUTOMATIC ASSIGNMENT OF ADDRESSES IN A COMPUTER COMMUNICATIONS NETWORK

[75] Inventors: Shirish S. Sathaye, North Chelmsford; Brendan Hannigan, West Newton; William R. Hawe, Pepperell, all of Mass.

[73] Assignee: Digital Equipment Corporation, Maynard, Mass.

[21] Appl. No.: 268,214

[22] Filed: Jun. 29, 1994

[51] Int. Cl.⁶ .................................................. G06F 15/177
[52] U.S. Cl. ..................................... 395/200.1; 364/280.2; 364/284.4; 364/242.94; 364/940.64; 364/DIG. 1; 395/829
[58] Field of Search .................................... 395/800, 829, 395/830, 182.05, 183.12, 200.1

[56] References Cited

U.S. PATENT DOCUMENTS

| | | | |
|---|---|---|---|
| 4,451,898 | 5/1984 | Palermo | 395/775 |
| 4,680,583 | 7/1987 | Grover | 340/825.52 |
| 4,727,475 | 2/1988 | Kiremidjian | 395/284 |
| 4,744,025 | 5/1988 | Lipcon | 395/497.03 |
| 5,465,251 | 11/1995 | Judd | 370/54 |

*Primary Examiner*—Eric Coleman
*Attorney, Agent, or Firm*—Kenneth F. Kozik

[57] ABSTRACT

The apparatus stores a manual flag having a stored manual flag logic value, and the manual flag is stored in a first non-volatile memory. The apparatus stores a trusted flag having a stored trusted flag logic value, and the trusted flag is stored in a second non-volatile memory. The apparatus is connected to a computer network for performing a first boot-up operation. The apparatus learns an address of a neighbor apparatus connected through the communications network. The apparatus is responsive: to the manual flag, and to the trusted flag, and to the first boot-up operation, and to learning a neighbor address of the neighbor apparatus, for configuring an address of the apparatus from an identifier stored in a third non-volatile memory, and from the neighbor address, and for changing the stored trusted flag logic value to a second logic value. Also the apparatus chooses, responsive to the manual flag, between using a manually loaded address or performing the configuring an address. Additionally, the apparatus decides, responsive to a neighbor trusted flag learned by communicating with the neighbor apparatus through the communications network, to use the neighbor address of the neighbor apparatus in configuring an address of the apparatus.

12 Claims, 7 Drawing Sheets

DCC ATM FORMAT

ICD ATM FORMAT

E.164 ATM FORMAT

AUTOMATIC ASSIGNMENT OF ADDRESSES IN A COMPUTER COMMUNICATIONS NETWORK

FIELD OF THE INVENTION

This invention relates generally to the assignment of addresses to entities in a computer communication network, and more particularly to dynamic assignment of addresses in response to changes in the network.

BACKGROUND OF THE INVENTION

A computer network typically consists of many different entities. A first type of entity is an end station. An end station is a computer from which message traffic is originated, known as a source node, and also at which message traffic is received, known as a destination node. A second type of entity is an intermediate node. An intermediate node receives message traffic and forwards the messages onto a further network to move the message on to the desired destination station. Typically, an intermediate node receives messages from either end stations or from other intermediate nodes, and the intermediate node is connected to several networks so that the intermediate node makes a decision as to which network the message is to be forwarded. Typically, intermediate nodes are point-to-point switches, routers, bridges, etc.

In order for a message to be forwarded to a first intermediate node by either an end station or another intermediate node, the first intermediate node must have an address. The address is, typically, a binary number, that is a series of "1" and "0" characters. The address of every addressable entity in the network must be unique in order for a message to be delivered to the right place.

The binary address is usually divided into fields, and the fields are typically represented in hexadecimal notation for ease of human consideration. At least one field of the address of an entity is, typically, built into the apparatus of the entity by the manufacturer of the entity by placing a unique address in a read only non-volatile memory at the factory when the entity was manufactured. The non-volatile memory is typically a semiconductor Read Only Memory, or ROM. The entity is said to contain an End Station Identifier, or ESI in the ROM. When the entity is an intermediate node, the ROM in the intermediate node is said to contain an ESI for that intermediate node. Typically, the address stored in the non-volatile read only memory in an entity is referred to as the "physical address" of the entity. In other words, the ESI may be the physical address.

The Institute of Electrical and Electronic Engineers, hereinafter IEEE, performs a service of assisting in keeping track of physical addresses of addressable network entities. The IEEE assigns blocks of addresses to manufacturers. The manufacturer then assigns one address from its assigned block of addresses to each addressable entity manufactured by writing the address into a non-volatile read only memory installed in the entity.

For example, a network may be designed in accordance with the specifications promulgated as Asynchronous Transfer Mode, or ATM, networks, by the ATM Forum. The ATM Forum is a voluntary association of manufacturers and other interested parties, and the specifications are promulgated by agreement of the members of the association. The ATM technique, as it is known today, is disclosed in the textbook, "ATM User-Network Interface Specification, Version 3.0", Prentice Hall, Englewood Cliffs, N.J., 1993, all disclosures of which are incorporated herein by reference.

In the ATM technique of computer network design, there are at least two types of entities defined. The first type of entity is an end station, and the second type of entity is an intermediate node referred to as an "ATM Switch". An ATM switch is a point to point switch. Each end station is connected to one ATM Switch. Several ATM Switches may be connected to other ATM Switches. The point to point character of the ATM Switches permits appropriate connections to be made in each ATM Switch to connect any two desired end stations together for the transfer of message traffic.

When ATM Switches are connected into a network, it is desirable to assign an address to each in a manner which creates a hierarchical network having Peer Groups at different levels of the hierarchy. Creating such a hierarchical network requires adding bytes of address to the ESI of each ATM Switch. The added bytes define the hierarchical construction. In accordance with specifications of the ATM Forum, the added bytes are used as prefixes of the ESI of the switch.

Human intervention is required to add the hierarchical bytes to the ESI of an ATM Switch. Unfortunately, human intervention is slow, costly, and prone to error.

It is desirable to have an automatic method of assigning addresses to intermediate nodes in a computer network so as to create a desired addressing environment.

SUMMARY OF THE INVENTION

The invention is an apparatus which autoconfigures its address in a hierarchial computer network.

The apparatus stores a manual flag having a stored manual flag logic value, and the manual flag is stored in a first non-volatile memory. The apparatus stores a trusted flag having a stored trusted flag logic value, and the trusted flag is stored in a second non-volatile memory. The apparatus is connected to a computer network for performing a first boot-up operation. The apparatus learns an address of a neighbor apparatus connected through the communications network. The apparatus is responsive: to the manual flag, and to the trusted flag, and to the first boot-up operation, and to learning a neighbor address of the neighbor apparatus, for configuring an address of the apparatus from an identifier stored in a third non-volatile memory, and from the neighbor address, and for changing the stored trusted flag logic value to a second logic value.

Also the apparatus chooses, responsive to the manual flag, between using a manually loaded address or performing the configuring an address. Additionally, the apparatus decides, responsive to a neighbor trusted flag learned by communicating with the neighbor apparatus through the communications network, to use the neighbor address of the neighbor apparatus in configuring an address of the apparatus.

BRIEF DESCRIPTION OF THE DRAWINGS

Referring now to the drawings, in which like numerals represent like parts in the several views.

DETAILED DESCRIPTION

Figure 1A:
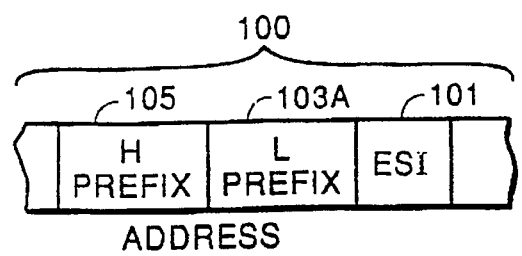
FIG. 1A is a field diagram of an address of a switch or an end station in a computer network.

Turning now to FIG. 1, there is shown a field diagram of an address 100 of a node in a computer network. The ESI field 101 is a unique identifier of the apparatus of the node. The ESI field 101 may, for example, be contained in a read only memory, ROM, installed in the apparatus by the manufacturer at the time of manufacture. An example of addresses stored in a ROM during manufacture of an apparatus is the MAC address assigned under auspices of the Institute of Electrical and Electronic Engineers, hereinafter the IEEE.

The IEEE administers a program whereby manufacturers are assigned blocks of addresses, and the manufacturer then assigns a unique address, drawn from the assigned block, to each article which he manufactures. The MAC address assigned by the IEEE and the manufacturer is ordinarily regarded as the physical address of the apparatus. In the IEEE program, the physical address is normally six (6) bytes of eight (8) bits each for a total of 48 bits. In an exemplary embodiment of the invention, the ESI field 101 is the six (6) byte physical address assigned by the combination of the IEEE and the manufacturer.

The L Prefix 103A is a unique address for switches. For example, an end station is connected to a switch. In the address of an end station, the L Prefix 103A is the physical address of the switch to which the end station is connected. That is, the IEEE physical address assignment may be used for the L Prefix 103A of a switch.

Figure 1B:
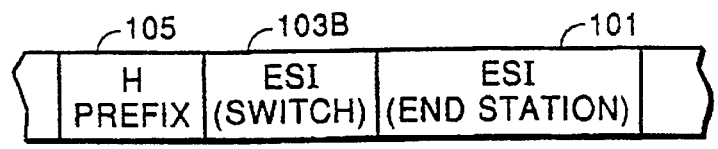
FIG. 1B is a field diagram of an address of an end station in a computer network.

FIG. 1B shows the L Prefix 103B and the ESI 101 field assigned as the address of an end station. The ESI field 101 is assigned the IEEE physical address of the end station, and is a six (6) byte field. The L Prefix field 103A is assigned the IEEE physical address of the switch to which the end station is connected, as is shown in field 103B of FIG. 1B.

Figure 1C:
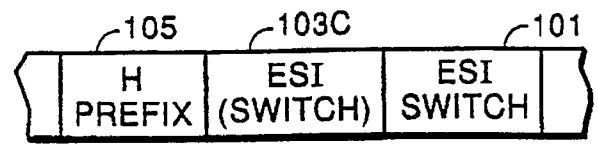
FIG. 1C is a field diagram of an address of a switch in a computer network.

FIG. 1C shows the L Prefix 103C of a switch. The IEEE physical address is assigned to the ESI field 101 of the switch. Also, the same IEEE address is assigned to the L Prefix field 103A, as is shown in field 103C of FIG. 1C. Accordingly, both the ESI field 101 and the L Prefix field are six (6) bytes, in accordance with the IEEE assignment convention for physical addresses.

H Prefix field 105 is used in the address of a switch, and the address of an end station, in order to specify hierarchical topology. H Prefix field 105 is assigned automatically, in accordance with the flow charts of FIG. 6, FIG. 7, and FIG. 8, as will be discussed in greater detail hereinbelow.

In an exemplary embodiment of the invention the H prefix is four (4) bytes long. Four bytes gives a field length of 32 bits. An alternative method of representing the contents of a byte of eight (8) bits is by two hexadecimal numbers. Each nibble of four (4) bits represents a hexadecimal number. The contents of a four byte field such as the H Prefix field 105 may then be represented as AB.CD.EF.GH. Each letter represents a hexadecimal character having a value between 0–F, and the period (.) separates bytes.

A further alternative method of representing a field is to subdivide the field into a plurality of subfields. Some of the subfields may be only one bit in length, other subfields may be a byte in length, and still other of the subfields may be longer than one byte. The field is divided into subfields for convenience in expressing logical components of the field. The subfields are then given names, where the names are usually an acronym of a few alphabetical characters. The field is then represented by concatenating the names with a symbol such as a period(.) separating the names. In an example, a filed may be subdivided into four subfields, where the names are FIELD1, FIELD2, FIELD3, and FIELD4. The full field is then represented as:

FIELD1.FIELD2.FIELD3.FIELD4 and it can be seen that the first example of AB.CD.EF.GH. simply put the subfield boundaries at the byte boundaries.

Figure 2:
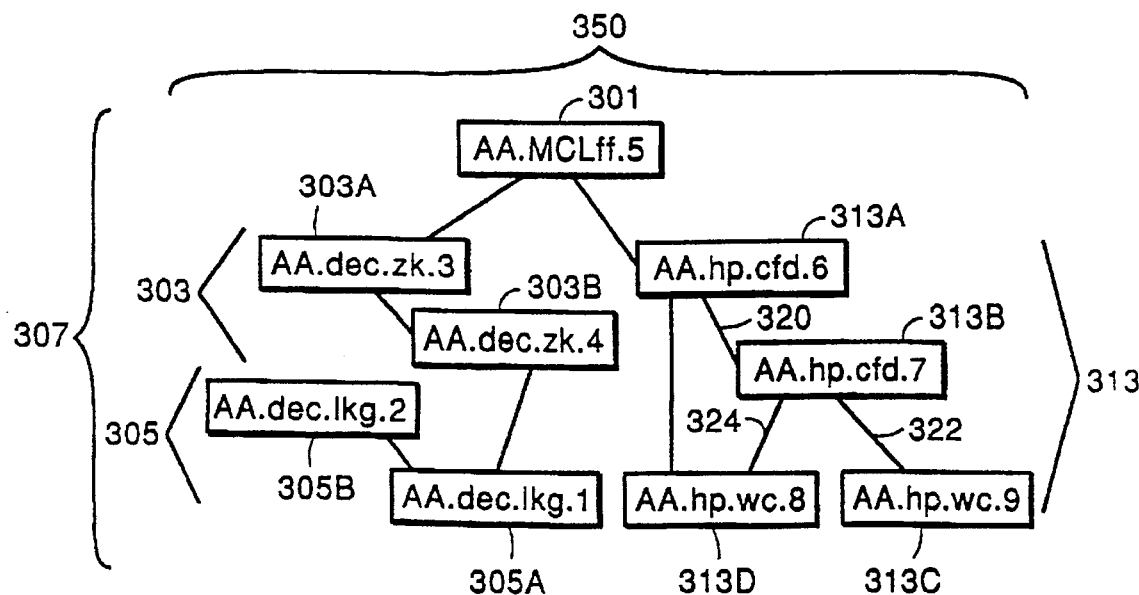
FIG. 2 is an example of physically connected switches.
Figure 4:
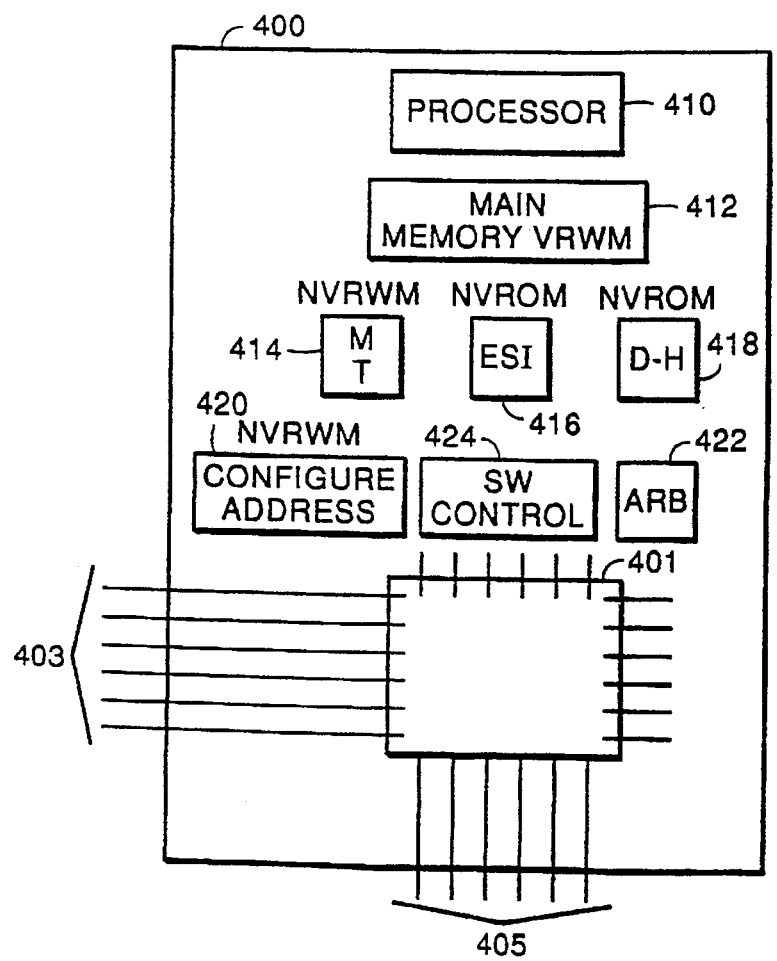
FIG. 4 is a block diagram of a network switch.

Turning now to FIG. 2, there is shown an exemplary hierarchically switched computer network. The physical switches 301 303A 303B 305A 305B 313A 313B 313C 313D are shown. The physical switches are hardware as shown in FIG. 4. The hierarchal address of each switch is shown using the format of a field such as H prefix field 105, with periods (.) separating subfields. Each subfield may be represented by a number of alphabetical characters, or sometimes by a single alphabetical character. For example, the address of switch 301 is AA.MCI.ff.5, the address of switch 303A is AA.dec.zk.3, etc.

Figure 3:
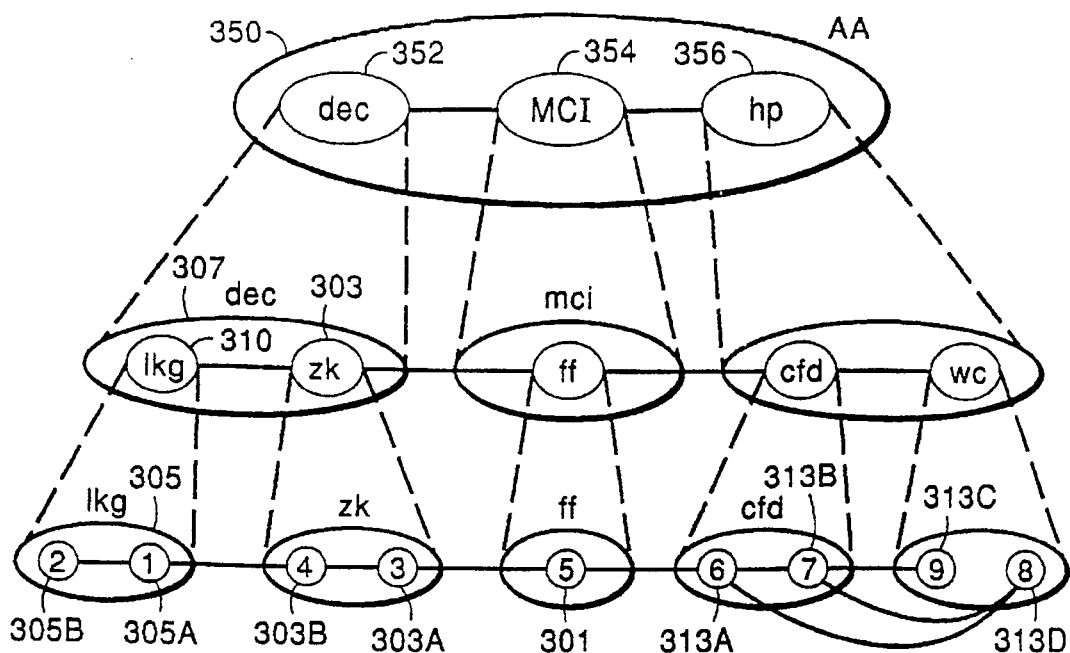
FIG. 3 is a hierarchial representation of the physical network shown in FIG. 2.

Turning now to FIG. 3, there is shown a logical hierarchical arrangement of the network of FIG. 2. Logical nodes 352, 354, 356 are members of the peer group 350. A peer group is a plurality of nodes that can be represented as a single entity, and that single entity is referred to as a logical node. A node can either be a physical switch or a logical node, depending upon its position in the hierarchy. A peer group is represented as a logical node in the next higher level of the hierarchy. For example, physical switch 305A, having address AA.dec.1kg.1, is part of the peer group 305, and the peer group 305 is a logical node 310 in the peer group dec 307. Peer group dec 307 is a logical node 352 in the peer group AA 350. At the lowest level of the peer group hierarchical arrangement a logical node is a physical node, that is a physical ATM switch. Accordingly, logical node 305A in FIG. 3 is also physical switch 305A as shown in FIG. 2. Further, logical node 310 is not a physical switch, but is a member of the peer group dec 307. Also, logical node 352 is not a physical switch, but is a member of peer group 350.

The arrangement of logical nodes and physical switches may be better understood by reference to an example referring to telephone numbering. Telephone numbers illustrate the logical hierarchy of a network as illustrated in FIG. 3. A United States Telephone number is usually represented by ten (10) digits as:

ABC.DEF.GHIJ

Each letter represents a number. The area code is represented as peer group ABC. By analogy, the level of peer group of ABC would be peer group 307, represented as logical node 352 in peer group 350 in FIG. 3. Peer group 350 is a level above the area code of an ordinary telephone number.

The exchange number is represented by the peer group DEF, where DEF is a logical node in peer group ABC. By analogy with FIG. 3, peer group 305 is analogous to logical node 310 in peer group 307.

People who have telephones are individually addressed by the four digits represented by GHIJ, and so telephones GHIJ are physical telephones at the lowest level of the hierarchy shown in FIG. 3. By analogy with FIG. 3, physical switch 305A is at the lowest level of the hierarchy, and is hardware.

As an extension of the telephone number example, a field representing a country code, represented by CC, may be added as a prefix to the above ten digits, and the telephone number then becomes:

CC.ABC.DEF.GHIJ and accordingly, the telephone number has become a four field structure having fields of different lengths. The logical nodes represented by the country code CC are at the highest peer group level such as peer group 350 as shown in FIG. 3.

Figure 5:
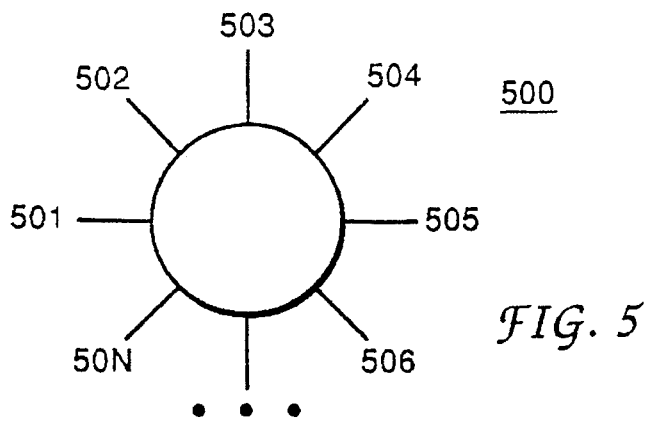
FIG. 5 is a network switch.

Turning now to FIG. 4, there is shown a block diagram of a switch 400. Switch fabric 401 switches any input line 403 to any output line 405. As an example, switch fabric 401 could be a cross point connector, or alternatively, switch fabric 401 could be implemented as any switching technology capable of connecting a one input line of a plurality of input lines to any one of a plurality of output lines. Input lines 403 and output lines 405 are physical lines. Each physical line may carry many virtual circuits. A message cell arriving on a particular input line 403 and assigned to a particular virtual circuit exits switch fabric 401 in the proper output line 405, as assigned by forwarding tables in switch 400 for the particular virtual circuit. FIG. 5 is a block diagram of all of the physical connections, 501, 502, 503 . . . 50N connected to a switch. Switch fabric 401 switches message cells entering at one physical line say 501, to any outgoing line, say 50N. Switching between an arbitrary input and an arbitrary output is done by switch 400 responding to virtual circuit information in a message cell header, as will be further discussed with reference to FIGS. 9–11. Referring to FIG. 3, in the event that switch 400, 500 represents switch 313B, then line 501 could represent physical connection 320, line 502 could represent physical connection 322, and line 503 could represent physical connection 324. Each of the physical connections may carry a plurality of virtual circuits, such as hundreds or thousands of different virtual circuits. Likewise, switch 400, 500 could represent any of the switches mentioned in FIG. 2 or in FIG. 3.

Generally speaking, memory units used in computers may be divided into three types. The first type of memory used in computers is Non-Volatile read only memory, abbreviated as NVROM. NVROM is robust to power cycles, that is information stored in NVROM is not lost when power is removed from NVROM. NVROM is written into once by the manufacturer. After that one write operation, NVROM is read only. That is, no subsequent write operations are possible with NVROM.

A second type of memory used in a computer is Non-Volatile Read-Write Memory, abbreviated as NVRWM. NVRWM may be written to at will. Also, NVRWM is robust to power cycles. That is, information written into NVRWM is not lost when power is removed from the memory.

A third type of memory used in computers is ordinary volatile Read-Write memory, abbreviated as VRWM. VRWM memory may be written to at will. Information stored in VRWM is lost when power is removed from the memory. That is, the VRWM memory is volatile when subjected to power cycles.

Returning to FIG. 4, processor 410 controls switch 400. General memory 412 is used by processor 412 for computational tasks. General memory 412 is of the type VRWM, Read-Write Volatile memory, which can be written to at will, but which is erased by power cycles. Non-volatile Memory 414 is used to store a Manual Flag and to store a Trusted Flag. Non-Volatile Memory 414 is of the type NVRWM which may be written to at will, but which is robust to power cycles. Non-volatile memory 414 has an initial value of the Manual Flag and the Trusted Flag written therein by the manufacturer at the time that the switch 400 is manufactured. Non-volatile memory 414 has the characteristic that processor 410 can overwrite the initial values of the Manual Flag and the Trusted Flag, and the values written by processor 410 will survive power cycles, boot-ups, and other actions which will erase ordinary memory 412.

Read Only Memory 416 is used to store an IEEE assigned physical address to the apparatus, as assigned to the manufacturer of the apparatus by the IEEE and as assigned to the apparatus by the manufacturer. Read only Memory 416 is of the type NVROM, Non-Volatile Memory which can be written to only once, and which is robust to power cycles.

Read Only Memory 418 is used to store a default H prefix supplied by the apparatus manufacturer. Read only memory 418 is of the type NVROM, Non-Volatile Read Only Memory which can be written to only once, and which is robust to power cycles. Alternatively, Read Only Memory 418 could be implemented as NVRWM, Non-Volatile Read-Write Memory, in order to enable the network manager to use different default prefixes in switch 400.

Non-volatile memory 420 is used by switch 400 to store a value of address read from a neighbor switch, as will be more fully discussed with reference to the flow charts of FIGS. 6–8. Non-Volatile Memory 420 is of the type NVRWM, Non-Volatile Read-Write Memory which can be written to at will, and which is robust to power cycles. Non-volatile memory 420 has the characteristic that processor 410 can write data into non-volatile memory 420, and the power to switch 400 may then be removed. Upon a subsequent boot-up of switch 400, the data written into non-volatile memory 420 will be unchanged, and the processor 410 can read the preserved data from non-volatile memory 420.

Arbiter 422 controls which incoming line receives activity of switching fabric 401. Control 424 controls operation of switching fabric connector 401.

Processor 410 controls operation of switch 400, and processor 400 makes use of the NVRWM Non Volatile Read-Write Memories 414, 420, and makes use of NVROM Non-Volatile Read Only Memories 416, 418, although it is possible to implement the invention using NVRWM memory to store the default H prefix in memory 418. Further, processor 410 can intervene in operation of arbiter 422 and control 424, as is well understood by those skilled in the art of computer switched networks.

Figure 6:
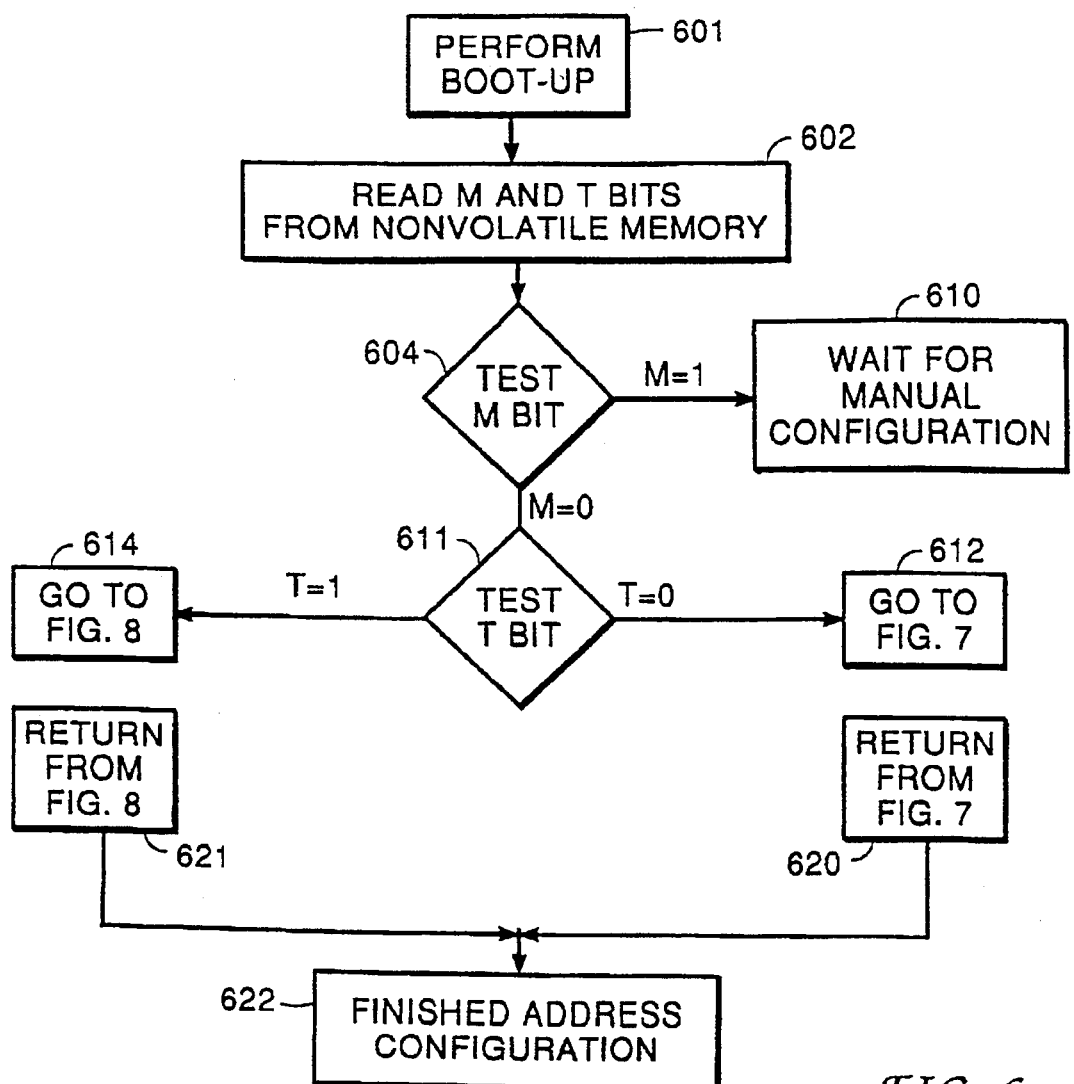
FIG. 6 is a flow chart of the invention.

Turning now to FIG. 6, there is shown a flow chart of the operation of the invention. At block 601 the switch 400 is subjected to a boot-up operation. At block 602 the processor 410 reads the Manual Flag and the Trusted Flag from non-volatile memory 414.

In an exemplary embodiment of the invention, the Manual Flag is a bit, referred to as the M bit, and the M bit may have the value of "0" or the value of "1". Also, the Trusted Flag is a bit, referred to as the T bit, and the T bit may have the value of "0" or "1". In an exemplary embodiment of the invention, the manufacturer writes the M bit as "0" upon manufacture of the switch 400, and ships the switch 400 with the M bit set at a value of "0". Also, the T bit is set to a value of "0" at manufacture, and the switch 400 is shipped with the value of T set equal to "0". The M and T bits are spoken of as the "s rate variables" of the switch, and their values represented as MT, in this exemplary case the state variables are represented as 00.

As an alternative procedure, a network manager, a person, may first boot up the switch 400, and manually set values of the M and T bits as he prefers. Then, on a subsequent boot up, the switch 400 finds stored in NVRWM non volatile read-write memory 414 the values written there by the network manager.

Upon completion of reading the M and T bits from non-volatile NVRWM memory 414, switch 400 then enters block 604 where the values of the M bit is tested. In the event that the M bit has the value "1", the processor goes to block 610 where it waits for manual configuration of the address.

In the event that the M bit has the value "0", then the T bit is tested at block 611. In the event that the T bit has the value of "0", the flow Goes to block 612, and thence to FIG. 7.

Figure 7:
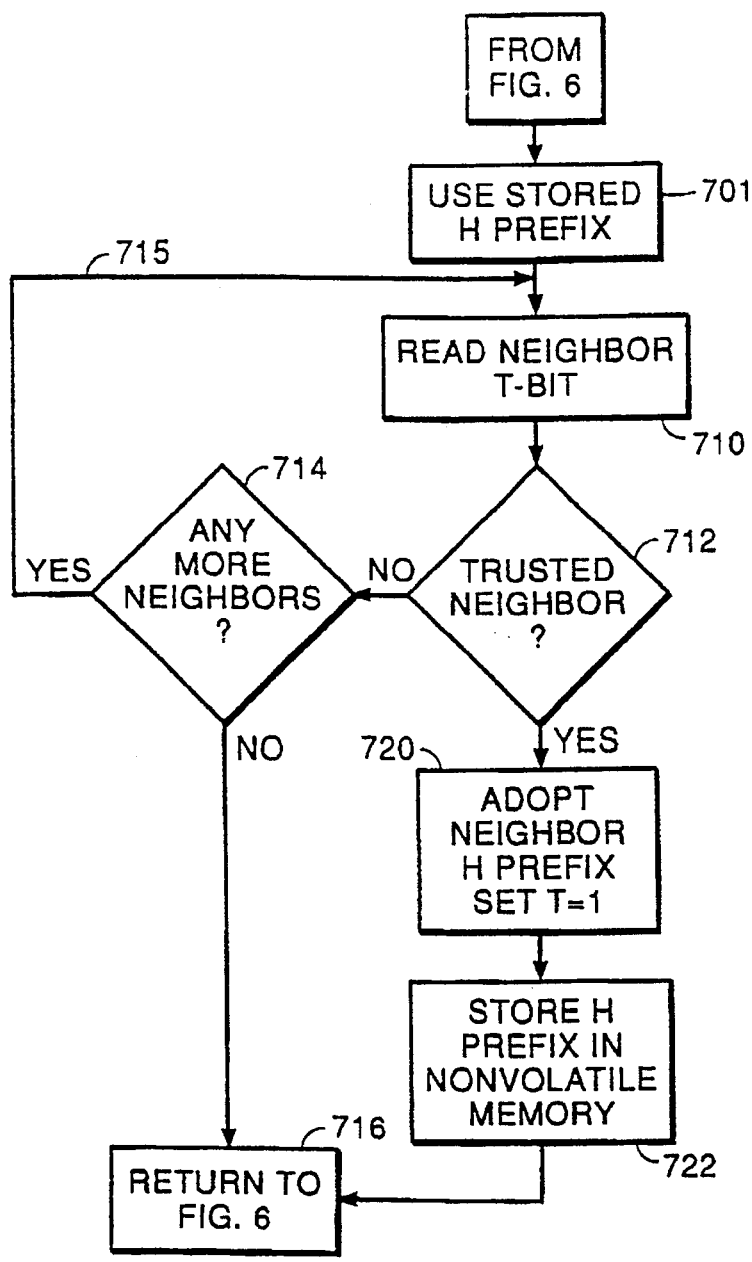
FIG. 7 is a flow chart of the invention.

In FIG. 7, the flow enters block 701, where processor 410 reads the default H prefix from NVROM non-volatile read only memory 418. The address is then configured with the H prefix 105 as read from NVROM non-volatile read only memory 418, the L prefix 103C is set equal to the switch IEEE physical address, and the ESI field 101 is also set equal to the IEEE physical address, as shown in FIG. 1C. The flow then enters blocks 710. At block 710 the switch reads a neighbor's T bit value. At block 712 the value of the neighbor's T bit value is tested. In the event that the test in block 712 answers that the neighbor's T bit value is set to "0", then the neighbor is not trusted, and the flow enters block 714. At block 714 it is determined whether or not any more neighbors switches exist. In the event that there are more neighbor switches, the flow proceeds along line 715 to loop back to block 710, where the next neighbor's T bit value is read by switch 400. In the event that there are no more neighbors whose T bit value has not been tested, then the flow goes to block 716 where the flow returns to FIG. 6 at block 620. The flow then proceeds to Block 622, where the address configuration flow ends.

In the event that the test of the T bit value of a neighbors T bit at block 712 finds that the neighbor's T bit is set to "1", then the neighbor switch is trusted, and the flow goes to block 720. At block 720 the switch 400 adopts the neighbor's H Prefix. The flow then goes to block 722 where the adopted neighbor's H Prefix is stored into NVRWM non-volatile read-write memory 420. The flow then enters block 716 where the flow returns to FIG. 6, at block 620. The address configuration flow then ends at block 622.

In the event that all neighbor switches are interrogated, and it is found that all have their T bit set equal to "0", then the H Prefix 105 is set to the default value read from Read Only Memory 418, as occurred at block 701.

Figure 8:
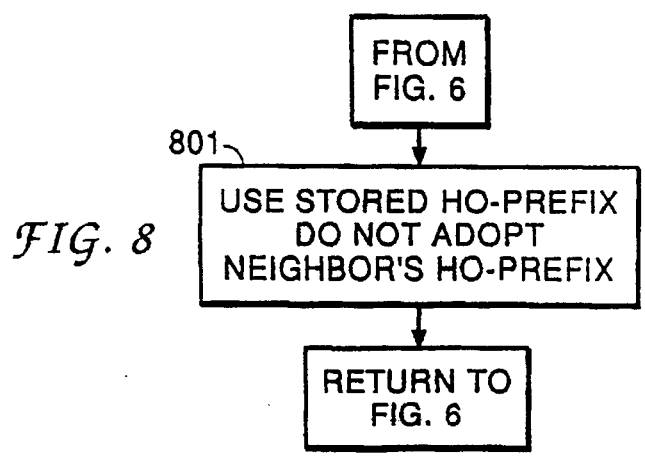
FIG. 8 is a flow chart of the invention.

Returning to block 604 and block 611 of FIG. 6, in the event that switch 400 has its M bit equal "0" and its T bit equal "1", then the flow is to block 614, and then to FIG. 8. As shown in FIG. 8, at block 801, switch 400 uses a value of the H Prefix stored in NVRWM non-volatile read-write memory 420. The H Prefix stored in NVRWM non-volatile read-write memory 420 is normally an H Prefix used previously, before a power crash, boot-up operation, etc. by switch 400. The H Prefix value stored in NVRWM non-volatile read-write memory 420 is typically a value learned from the default value stored in switch 400 in NVROM 418 and stored at block 701, or learned from a neighbor switch during an earlier cycle where the switch 400 logic flow for address configuration previously went through FIG. 7 and stored an H Prefix value at block 722. Upon completion of block 801, the flow returns to block 621 of FIG. 6.

Information exchange between switches is carried out by transfer of management data messages between switches, as is well understood by those skilled in the art of computer network design. In the present design, a switch requests the address of its neighbor switches, and the neighbor switches respond by replying by transmitting their address to the inquiring switch. Further, when a switch interrogates a neighbor switch for the value of the neighbor's T bit, then the neighbor responds with a management data message containing the value of the neighbor's T bit.

ATM EXEMPLARY EMBODIMENT OF THE INVENTION

Figure 9:
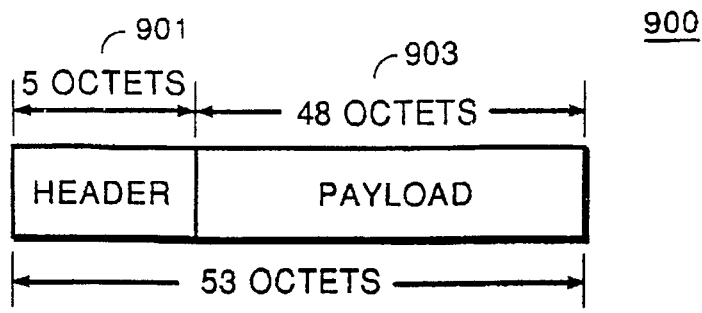
FIG. 9 is a field diagram of a message cell.
Figure 10:
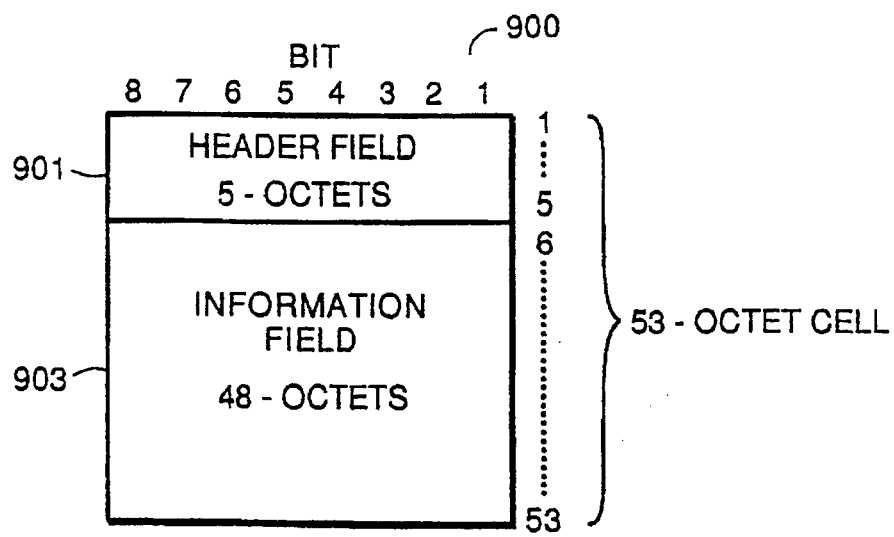
FIG. 10 is a field diagram of a message cell.

Turning now to FIG. 9, there is shown a typical data message cell, as is defined by the ATM Forum, for transfer of data by the Asynchronous Transfer Mode technique. Sufficient aspects of the ATM technique are fully disclosed in the textbook "ATM User-Network Interface Specification, Version 3.0", Prentice Hall, Englewood Cliffs, N.J., 1993, as mentioned hereinabove, in sufficient detail to permit a person of ordinary skill in the art to practice the ATM techniques needed for the present invention.

CELL ARCHITECTURE

The cell 900 has a header field 901 of five (5) bytes, or octets as they are called in the ATM Forum literature, and has a payload to carry data of 48 octets, for a total cell length of 53 octets, or bytes. The cell 900 is shown in more detail in FIG. 10, where the bit positions in each octet are shown. The header 901 is shown as comprising five (5) bytes, and the information field 903 comprising 48 octets.

Figure 11:
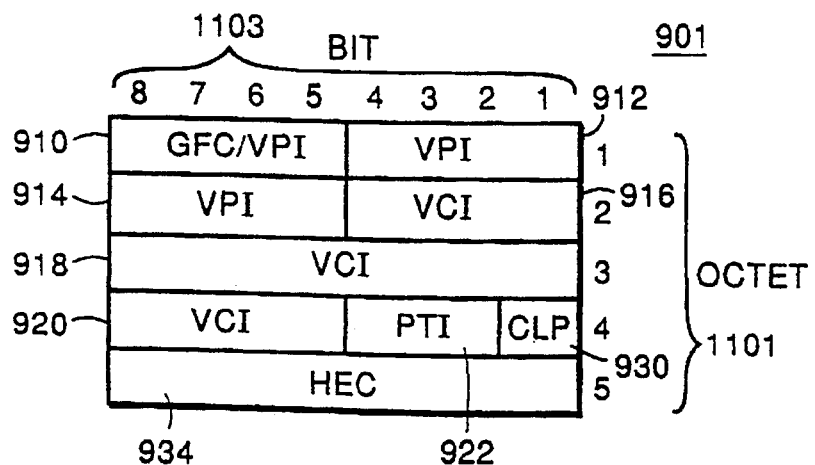
FIG. 11 is a field diagram of a header of a message cell.

Turning now to FIG. 11, the structure of the header 901 is shown in more detail. The function of each field will be briefly mentioned, however a detailed treatment of each field can be found in the previously mentioned textbook "ATM User-Network Interface Specification, Version 3.0", Prentice Hall, Englewood Cliffs, N.J., 1993.

GFC/VPI field 910 is a four bit field for use by a generic flow control mechanism. The VPI field 912, 914 and the VCI field 916, 918, 920 is a 24 bit set of fields for the purpose of identifying an ATM connection. An ATM connection is a virtual circuit, and VPI stands for Virtual Path Identifier, and VCI stands for Virtual Connection Identifier. Together this 24 bit field, and in an alternative format the 28 bits made up of the GFC/VPI field 910, and the VPI field 912, 914, and the vCI field 918, 920 identify the virtual circuit. By identifying virtual circuits, the switches are able to forward the message data cells 900 by only parsing the 24 or 28 bit fields, and not the longer address fields 100. When it is desired to transfer message data cells 900 from a source node to a destination node, the virtual circuit is first established. After the virtual circuit is established, the message data cells 900 are transmitted from the source station, through various switches along the established virtual circuit, until the message data cell arrives at its intended destination station, and the intended destination station is the end station of the virtual circuit.

The PTI field 922 is the Payload Identification Field. The PTI field 922 is a three (3) bit field. The values coded into the PTI field carry information concerning congestion in the network, or whether the cell is a system management cell.

The Cell Loss Priority field 930, or CLP field, is a one (1) bit field used for cell loss priority indication. A cell is marked as high priority for loss considerations by setting the CLP field 930 to "0". A cell is marked as low priority for loss considerations by setting the CLP field 930 to a value of "1". The CLP field is used by switches and end stations to decide between which cells to keep and which to discard in the event that congestion forces such a decision.

The HEC field 934 is a one (1) byte, eight (8) bit, field. HEC field 934 is an error check field for the header 901.

The octets of the header are numbered, and the numbers 1101 indicate the octet, where the 1101 numbers run from "1" to "5". Also, the bit positions are numbered by numbers 1103, running from "1" to "8". For example, octet 1, indicated by the number "1" of numbers 1101, contains the semi-octet field GFC/VPI indicated by bit position numbers 8, 7, 6, 5 of numbers 1103, and octet 1 also contains VPI semi octet field 912 which occupies bit positions 4, 3, 2, 1 as designated by numbers 1103.

ATM ADDRESSING

Figure 12:
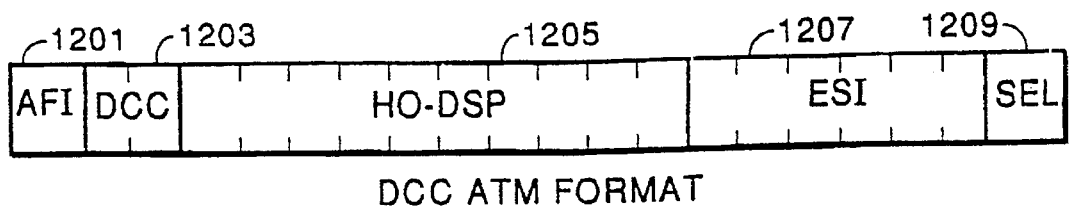
FIG. 12 is a field diagram of an optional ATM address.
Figure 13:
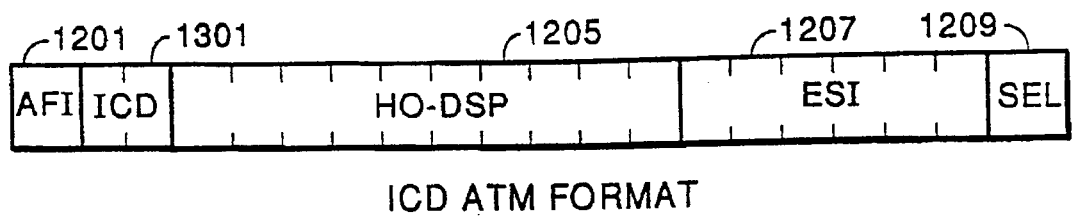
FIG. 13 is a field diagram of an optional ATM address.
Figure 14:
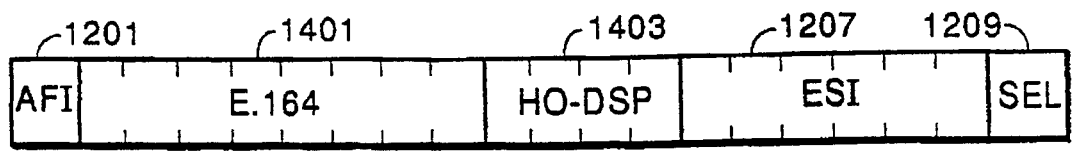
FIG. 14 is a field diagram of an optional ATM address.

Turning now to FIG. 12, FIG. 13, and FIG. 14, there are shown three alternative addressing formats defined by the ATM Forum, in Version 3.1 of the User Network Interface Specification. An ATM address is twenty (20) bytes long. Alternative addressing formats (not shown in this patent specification) are disclosed in an earlier Version 3.0 of the "ATM User Network Interface Specification", published by Prentice Hall, Englewood Cliffs, N.J., 1993, and mentioned hereinabove.

FIG. 12 shows an address format referred to as the DCC ATM addressing format, where DCC stands for Data Country Code. The twenty (20) octet long address is broken into fields as follows:

AFI field 1201: The AFI field is one (1) octet long. The AFI field has the presently defined values, as shown in Table 1:

TABLE 1

| Value | Meaning |
|---|---|
| 39 | DCC ATM Format |
| 47 | ICD ATM Format |
| 45 | E.164 ATM Format |

Further, each of the other two representative address formats, shown in FIG. 13 and FIG. 14 use the AFI field as their first field. The AFI field, through use of the values given in Table 1, selects the addressing format. That is, the value coded into the AFI field selects between the addressing formats of: DCC ATM format of FIG. 12; or ICD ATM Format of FIG. 13; or E.164 ATM Format of FIG. 14.

DCC field 1203: The DCC field is two (2) octets long. The DCC field specifies the country in which the address is registered.

The HO-DSPP field 1205: The HO-DSPP field is 10 bytes long. The HO-DSPP field coding is specified by the authority identified by the AFI 1201 field and the DCC 1203 field.

The contents of the HO-DSPP field not only describe hierarchy of the addressing authority, but also conveys network topological significance. The HO-DSPP field is constructed in such a way that routing through interconnected ATM subnetworks is facilitated.

The ESI 1207 field: The ESI field is 6 bytes long. The ESI field is assigned a unique identifier of the apparatus, whether the apparatus is an end system, or is an intermediate system such as an ATM switch.

The SEL 109 field: The SEL field is one (1) byte long. The SEL field is not defined for ATM routing, but is available for end systems to use for addressing.

The invention is implemented in the DCC ATM format of FIG. 12 by identifying the six byte ESI field 101 of FIG. 1 with the six octet ESI field 1207 of FIG. 12; and by identifying the combination of the six byte L Prefix field 103A and the four byte H Prefix field 105 with the ten byte HO-DSP field 1205 of FIG. 12. When the invention is implemented in the DCC ATM format, the default H prefix supplied by the apparatus manufacturer and stored in Read Only Memory 418, is given the octal value: "00000000" for a total of four octets, and the DCC field 1203 is given the octal value "9999" for a total of two octets, and the AFI field 1201 is given the octal value "39" for a total of one octet. The full twenty (20) byte address is, accordingly, expressed as:

"39.9999.00000000.ESI(1) .ESI(2) .SEL"

where the periods are used to separate the values of the fields shown in FIG. 12. The length of the address is twenty (20) octets, and breaks out as follows: "39" is one octet; "9999" is two octets; "00000000" is four octets; ESI(1) is six octets; ESI(2) is six octets; and SEL is one octet. In the event that the apparatus is an end station, then ESI(1) is the unique identifier of the switch connected to the end station, and ESI(2) is the unique identifier of the end station, as shown hereinabove with reference to FIG. 1B. In the event that the apparatus is an ATM switch, then ESI(1) and ESI (2) are both the unique identifier of the ATM switch, as shown hereinabove with reference to FIG. 1C.

FIG. 13 shows an address format referred to as the ICD ATM format, and the ICD ATM Format is selected by field AFI 1201 having the octal value of "47".

The ICD field 1301 is two (2) octets long. The ICD field 1301 contains an International Code Identifier, and is similar to the DCC field 1203 of FIG. 12. Details of this field values are given in the ATM User Network Interface Specification, both in Version 3.0 and Version 3.1, all disclosures of which are incorporated herein by reference.

The ICD ATM Format of FIG. 13 also uses: field HO-DSP 1205; field ESI 1207; and, field SEL 1209. When the invention is implemented in the DCC ATM format, the default H prefix supplied by the apparatus manufacturer and stored in Read Only Memory 418, is given the octal value: "00000000" for a total of four octets, and the DCC field 1203 is given the octal value "9999" for a total of two octets, and the AFI field 1201 is given the octal value "47" for a total of one octet. The full twenty (20) byte address is, accordingly, expressed as:

"47.9999.00000000.ESI(1) .ESI(2).SEL"

where the periods are used to separate the values of the fields shown in FIG. 12. The length of the address is twenty (20) octets, and breaks out as follows: "47" is one octet; "9999" is two octets; "00000000" is four octets; ESI(1) is six octets; ESI(2) is six octets; and SEL is one octet. In the event that the apparatus is an end station, then ESI(1) is the unique identifier of the switch connected to the end station, and ESI(2) is the unique identifier of the end station, as shown hereinabove with reference to FIG. 1B. In the event that the apparatus is an ATM switch, then ESI(1) and ESI(2) are both the unique identifier of the ATM switch, as shown hereinabove with reference to FIG. 1C.

The E.164 Format of FIG. 14 makes use of the E.164 field 1401. The E.164 field 1401 is eight octets long, and this field specifies Integrated Services Digital Network numbers. These numbers include telephone numbers. The international format of these numbers may be used. These international telephone numbers are specified as fifteen (15) numbers, and the eight octet field is padded with a leading semi-octet of "0000", and a final semioctet of "1111" to accommodate the fifteen digit telephone number, as further disclosed in the ATM User Network Interface Specification, Version 3.0 and Version 3.1.

HELLO Messages, and Other Management Messages

HELLO messages, and other management messages are exchanged by ATM switches in order to implement the invention. A first purpose for an ATM switch to contact a neighbor switch is to learn the address of the neighbor switch. A second purpose for an ATM switch to contact its neighbor is to learn if the neighbor's Trusted Flag, or Trusted Bit, indicates that the address of the neighbor is "Trusted", in accordance with the trusted Flag as it is stored in non-volatile memory 414.

In an exemplary embodiment of the invention, a management message is sent to other ATM switches by a particular switch by using a dedicated virtual circuit. The management message is contained in a cell having the format given in FIG. 9, FIG. 10, and FIG. 11. The dedicated virtual circuit is indicated by the VCI semi-octet in octet 4, shown by "4" of numbers 1101, and at bit positions 5, 6, 7, 8 of numbers 1103, having coded therein a dedicated value. The dedicated value coded into VCI field 920 at octet 4, bit positions 8,7,6,5 indicates that a particular type of management message is carried in the payload field 903 of the cell. For example, signaling information is carried for virtual circuit 5, indicated by field VCI 920 having coded therein the value "0101". Details of use of virtual circuit "5" for signalling are set out in Section 5, "UNI Signalling" in the textbook "ATM User-Network Interface Specification, Version 3.0", Prentice Hall, Englewood Cliffs, N.J., 1993, mentioned hereinabove.

Figure 15:
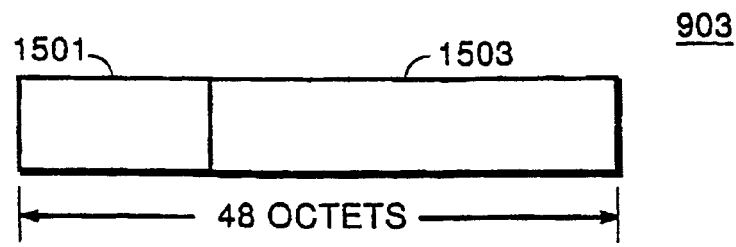
FIG. 15 is a field diagram of a payload field of a message cell.

A cell carrying addressing information may have VCI field 920 coded with value "6", or "0110". The payload field 903 is divided as shown in FIG. 15, where field 1501 is one octet long and carries an indicator. The indicator in field 1501 may indicate whether the address of a neighbor is requested, in which case field 1503 is simply padded to give the cell a length of 53 octets. Alternatively, the indicator in field 1501 may indicate that the cell is a response, and that the address of the originating switch is carried within payload field 1503. As a further alternative, the indicator in field 1501 may indicate that the value of a neighbor switch's trusted bit is requested. As a still further alternative, the indicator in field 1501 may indicate that the cell is a response and that the value of the originating switch's trusted bit is carried in field 1503. By use of a dedicated virtual circuit, indicated by a dedicated value in VCI field 920, and by an indicator field in the payload field such as field 1501, the queries and responses needed to implement the invention may be implemented in the ATM protocol.

AUTOCONFIGURATION OF A NETWORK

When an ATM switch is shipped by a manufacturer the M bit is set to 0, and the T bit is set to 0, and both are stored in non-volatile memory 414. A default prefix is stored in Read Only Memory 418, and the default prefix is represented by the symbol DHO. When a single switch is first powered up, its address becomes, by default, DHO.ESI(switch).ESI(switch).SEL where ESI (switch) is the unique physical address of the switch. The T bit is then set to 1. If a few switches are connected together, than as subsequent switches are connected, they will read the T bit of the first switch and learn that it is a trusted switch with T set to 1. This small network of switches will therefore autoconfigure to a "flat" hierarchical network.

In a network having a number of peer groups in a hierarchical topology, one switch in a peer group is manually configured to have a desired H prefix 105, and its trusted bit T set to 1. This manually configured switch is indicated as switch_1,1, where 1,1 indicates M is set to 1 and T is set to 1. When a new switch is connected to switch 1,1, and is powered up, with its M bit set to g, and its T bit set to 0, the new switch will adopt the prefix of switch_1,1, and reset its T bit to 1. So also will further new switches connected in the peer group of switch_1,1 adopt the manually configured prefix of switch_1,1. Accordingly, as further switches are added, they will autoconfigure their addresses to join the peer group of the single manually configured switch in that peer group. No manual intervention by the network manager is needed to configure the addresses of new switches as they are added to a peer group.

As a further consideration, the manually configured switch, switch_1,1, may first be manually configured and subsequently have its M bit changed to 0. This change of the M bit to 0 causes the switch to autoconfigure to the manually inserted address on subsequent boot up operations. In the event that the M bit is not subsequently set to 0 and remains as 1, then on subsequent boot up operations the switch will need to again have its address manually configured.

In the event that a new switch is connected to two or more switches which have already configured their address, the network manager has two choices, he may care which switch's address the new switch adopts, or he may not care. In the event that he does not care, then the M bit of the new switch is set to 0, and the T bit also set to 0. The new switch then adopts the address of the first old switch which it finds with a T bit set to 1. In the event that the network manager cares which address the new switch has, he must first set the M bit of the new switch to 1, and then manually configure the new switch.

A switch which implements the present invention may co-exist with switches not implementing the present invention. The switches not implementing the invention will not be expected to have a trusted bit, and so cannot respond to an interrogation by the switch implementing the invention. The switch implementing the invention must simply have the network manager set its M bit to 1, and then the network manager manually configures its address.

Figure 16:
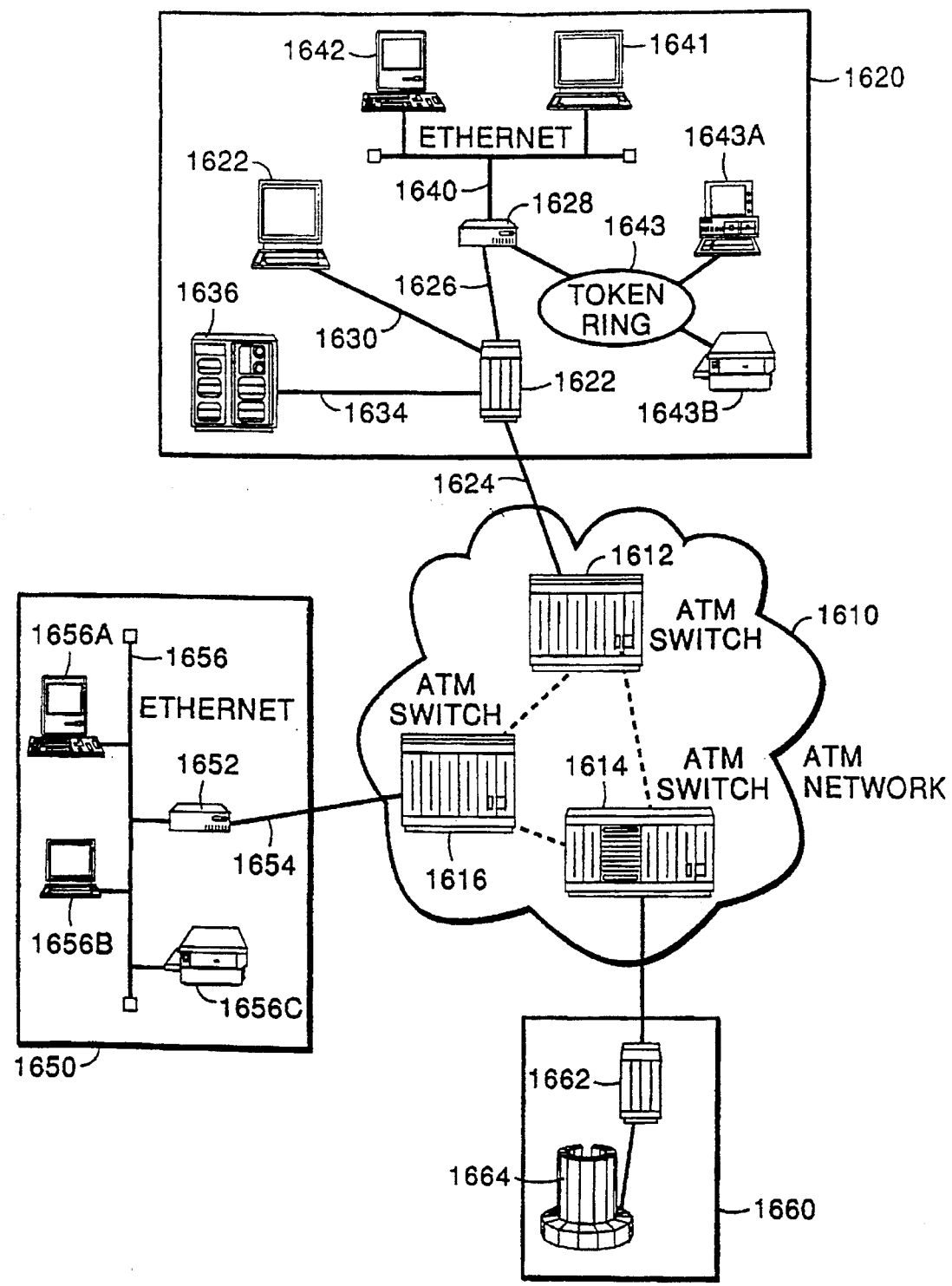
FIG. 16 is a block diagram of the physical connections in a typical ATM computer network.

Turning now to FIG. 16, there is shown a typical ATM network having ATM switches which implement the invention. ATM network cloud 1610 contains an arbitrary arrangement of ATM switches, represented by ATM switch 1612, ATM switch 1614, and ATM switch 1616. ATM switches 1612, 1614, 1616 are, for example, connected in a hierarchal arrangement as set out in FIG. 2 and FIG. 3, hereinabove. The various levels of a hierarchal arrangement of ATM switches in the ATM network cloud 1610 can self configure their addresses using the invention. ATM switches in ATM network cloud 1610, and all ATM switches connected to cloud 1610, are internally substantially as shown in FIG. 4, and as discussed therewith.

Block 1620 represents a private network connected to the ATM network cloud by private ATM switch 1622. Physical connection 1624 connects private ATM switch 1622 to representative ATM switch 1612, where representative ATM switch 1612 is a member of ATM network cloud 1610. Private ATM switch 1622 uses the invention to self configures its address to the H Prefix 105 of ATM switch 1612. Private ATM switch 1622 then has in its address, as shown in FIG. 1C, the H Prefix 105 of ATM switch 1612, and the ESI in field 103C of itself, ATM switch 1622.

ATM switch 1622 then has physical connection 1626 to bridge 1628, physical connection 1630 to workstation 1632, and physical connection 1634 to main frame computer 1636. Bridge 1628 has physical connection 1640 functioning as an ethernet local area network, and workstation 1641 and 1642 are connected to ethernet 1640. Further, bridge 1628 is connected to token ring local area network 1643. Token ring local area network 1643 may have many entities connected thereto, as represented by workstation 1643A and printer 1643B.

Each entity connected to ATM switch 1622 is an ATM end station and must have an ATM address as set out in FIG. 1B. Accordingly, each entity connected to ATM switch 1622 self configures its address to the H prefix 105 of ATM switch 1622. That is, bridge 1628, workstation 1632, and main frame computer 1636 all self configure the H prefix 105 of their ATM address to the H Prefix of ATM switch 1622. Accordingly, bridge 1628, workstation 1632, and main frame computer 1636 each self configure their ATM address to the type of address shown in FIG. 1B, and as discussed in relation thereto. That is bridge 1628, workstation 1632, and main frame computer 1636 each adopt the H prefix of ATM switch 1622 in field 105, and place the ESI of ATM switch 1622 in field 103B of their address.

Connections to the entities, bridge 1628, workstation 1632, and main frame computer 1636, each can carry a plurality of virtual circuits. The plurality of virtual circuits may be in the tens, hundreds, thousands, etc. and are designated by the contents of fields 910, 912, 914, 916, 918, 920 of header 901 as shown and described in reference to FIG. 9, FIG. 10, and FIG. 11, hereinabove.

Block 1650 shows bridge 1652 connected through physical connection 1654 to an ATM switch 1616 of the ATM network cloud 1610. Bridge 1652 uses the invention to automatically configure its address to the address of ATM switch 1616, as shown in FIG. 1B. Accordingly, bridge 1652 adopts the H prefix of ATM switch 1616, and the ESI of ATM switch 1616 is used in field 1038 of the ATM address of bridge 1652.

Bridge 1652 connects to ethernet local area network 1656. Ethernet local area network 1656 is shown having workstation 1656A, workstation 1656B, and printer 1656C connected thereto. Each of the entities connected to ethernet 1656, workstation 1656A, workstation 1656B, and printer 1656C, are addressed by a plurality of virtual circuits connected to bridge 1652 through physical connection 1654. The virtual circuits are specified by fields in header 901 of message cells 900.

A further example of use of the invention is illustrated in block 1660. Private ATM switch 1662 uses the invention to self configure its address to contain the H Prefix of ATM switch 1614, of ATM network cloud 1610, as the contents of field 105 of the address of ATM switch 1662. Supercomputer 1664 then uses the invention to adopt the H Prefix of ATM switch 1662 as the H Prefix 105 of its address, as shown in FIG. 1B. Also supercomputer 1664 places the ESI of ATM switch 1662 into field 103B of its address, as shown in FIG. 1B.

It is to be understood that the above-described embodiments are simply illustrative of the principles of the invention. Various other modifications and changes may be made by those skilled in the art which will embody the principles of the invention and fall within the spirit and scope thereof.

What is claimed is:

1. An apparatus for use in a communications network, comprising:

means for storing a manual flag having a stored manual flag logic value in said apparatus, said manual flag stored in a first non-volatile memory;

means for storing a trusted flag having a stored trusted flag logic value in said apparatus, said trusted flag stored in a second non-volatile memory;

means for connecting said apparatus to a computer network and for performing a boot-up operation;

means for learning an address of a neighbor apparatus connected through said communications network;

means, responsive to said manual flag and responsive to said trusted flag and responsive to said boot-up operation and responsive to learning a neighbor address of said neighbor apparatus, for configuring an address of said apparatus from an identifier stored in a third non-volatile memory in said apparatus and from said neighbor address, and for changing said stored trusted flag logic value to a second logic value.

2. The apparatus as in claim 1 further comprising:

means, responsive to said manual flag, for said apparatus to choose between using a manually loaded address or performing said configuring an address; and, means, responsive to a neighbor trusted flag learned by communicating with said neighbor apparatus through said communications network, for deciding to use said neighbor address of said neighbor apparatus in said configuring an address.

3. The apparatus as in claim 1 further comprising:

means, responsive to said configuring an address of said apparatus, for storing a configured address into a fourth non-volatile memory; and means, responsive to said second logic value of said trusted flag logic value, for said apparatus to use an address stored in said fourth non-volatile memory during said subsequent boot-up of said apparatus.

4. A communications network apparatus, comprising:

means for storing an end system identifier, ESI, of said apparatus in a first non-volatile memory;

means for storing a default value of a prefix in a second non-volatile memory;

means for using said default value of a prefix as a stored prefix, said default value of a prefix used as said stored prefix when said apparatus is manufactured;

means for setting a manual flag in said apparatus, said manual flag capable of having a first logic value, and capable of having a second logic value;

means for setting a trusted flag in said apparatus, said trusted flag capable of having a first logic value, and capable of having a second logic value;

update means for said apparatus to update an address assigned to said apparatus;

selection means for selecting a prefix during an event when said update means performs an update of said address assigned to said apparatus, said selection means responsive to said manual flag and responsive to said trusted flag as follows,

| value of manual flag | value of trusted flag | action |
|---|---|---|
| first logic value | first logic value | wait for manual configuration |
| first logic value | second logic value | wait for manual configuraiton |
| second logic value | second logic value | IF a trusted neighbor exists adopt a neightbor prefix of said trusted neightbor as a designated prefix store said designated prefix as said stored prefix set said trusted flag to said first logic value ELSE (no trusted neighbor exists) set said designated prefix to said stored prefix |
| second logic value | first logic value | set designated prefix to said stored prefix | address forming means to combine said designated prefix with said ESI of said apparatus, said designated prefix and said ESI forming at least a part of an address of said apparatus.

5. The apparatus as in claim 4 further comprising:

said manual flag is a manual bit, said first logic value is 1, and said second logic value is 0; and, said trusted flag is a trusted bit, said first logic value is 1, and said second logic value is 0.

6. The apparatus as in claim 4, further comprising: periodic means for initiating said update means to periodically update said address of said apparatus.

7. The apparatus as in claim 4 further comprising:

means for determining whether or not a neighbor intermediate node is trusted, and if said neighbor intermediate node is trusted, for transferring a value of said neighbor prefix to said apparatus to make said said designated prefix equal to said neighbor prefix.

8. The apparatus as in claim 4 wherein said default value of a prefix is 39.9999.00000000 octal.

9. The apparatus as in claim 4 wherein said apparatus is shipped new from the factory with said manual bit set to said second logic value, and said trusted bit is set to said second logic value.

10. The apparatus as in claim 4 further comprising:

means for determining if a trusted neighbor node exists by interrogating a trusted bit of said neighbor, and for determining that said neighbor is trusted in the event that said trusted bit of said neighbor has said first logic value.

11. The apparatus as in claim 4 further comprising:

means for connecting a plurality of said apparatus into a communications network, and each individual apparatus of said plurality of said apparatus communicating with each other by using an address made of said ESI of each said apparatus and said default prefix.

12. The apparatus as in claim 11 further comprising:

means for connecting said plurality of said apparatus to at least one additional said apparatus, and for manually configuring a additional prefix of said additional said apparatus to a manual prefix value, and manually setting a additional manual flag of said additional apparatus to said second logic value and for setting a additional trusted flag of said additional apparatus to said first logic value, to permit said update means in each said apparatus of said plurality of said apparatus to propagate said manual prefix value to said each said apparatus of said plurality of said apparatus.

* * * * *